United States Patent [19]

Luttinger

[11] Patent Number: 4,929,274

[45] Date of Patent: May 29, 1990

[54] RECOVERY OF METAL VALUES FROM ORES

[75] Inventor: Lionel B. Luttinger, Erwinna, Pa.

[73] Assignee: Drew Chemical Corporation, Boonton, N.J.

[21] Appl. No.: 362,896

[22] Filed: Jun. 7, 1989

[51] Int. Cl.$^5$ .............................................. C22B 11/04
[52] U.S. Cl. ...................................... 423/25; 75/722; 423/24; 423/29
[58] Field of Search .............. 75/101 R, 101 BE, 105, 75/118 R; 423/29, 24, 25

[56] References Cited

U.S. PATENT DOCUMENTS

| | | | |
|---|---|---|---|
| 1,519,396 | 12/1924 | Darrow | 423/29 |
| 1,549,856 | 8/1925 | Darrow | 423/29 |
| 2,234,140 | 3/1941 | Falconer | 75/105 |
| 4,721,526 | 1/1988 | Elmore | 75/118 R |

OTHER PUBLICATIONS

McClelland, Gene E., et al., "Silver and Gold Recovery from Low-Grade Resources" Mining Congress Journal, 1981, pp. 17–23.
CA92(16):132551q.
"Gold and Silver Heap and Dump Leaching Practice", Soc. Mining Eng., Proc. Fall 1983 SME Meeting, pp. 41–49 Pilot Scale Heap Leaching at the Pinson Mine, Humboldt County, Nev., Mark E. Smith and W. B. Craft.

*Primary Examiner*—Robert L. Stoll
*Attorney, Agent, or Firm*—Walter H. Schneider

[57] ABSTRACT

Heap leaching of gold/silver ores with an aqueous alkali cyanide solution containing a surfactant hydrolyzable at the pH of the solution, the surfactant being present in an amount sufficient to increase the rate of metal value recovery without adversely affecting the carbon efficiency in the subsequent step of separating the metal cyanide value from the pregnant leach solution by absorption on carbon columns.

4 Claims, No Drawings

RECOVERY OF METAL VALUES FROM ORES

BACKGROUND OF THE INVENTION

1. Field of the Invention

The present invention relates generally to the recovery of metal values from ores. More particularly, the present invention relates to the recovery of metal values by the leaching of ores. Still more particularly, the present invention relates to an improvement in the treatment of gold/silver ores by the method of heap-leaching in which the metal values are recovered as a cyanide complex.

2. Description of the Prior Art

The recovery of gold and silver by heap-leaching low grade ores and tailings from other recovery processes is well known. In general, the procedure comprises spraying, trickling or pouring on, or otherwise applying to, a pile of low grade ore or tailings an aqueous alkali cyanide solution, e.g., aqueous calcium, sodium or potassium cyanide, so as to cause the solution to permeate and percolate through the pile thereby extracting the metal values as a cyanide complex. The resultant metal cyanide complex-bearing liquor is recovered from the bottom of the pile, of which there is usually a series in an extraction facility, and routed to a recovery system for separating the metal cyanide complex by adsorption on a column of activated carbon, usually coconut shell carbon. The metal cyanide complex-bearing carbon particles are then further treated, as by electrowinning, to separate and recover the elemental metal value.

Various factors can affect the economics of heap leaching, a principal one being the physical nature of the crushed ore being treated. For instance, the presence of a high content of slimes or fines in a highly clayey ore can, in the presence of the aqueous leach solution, result in the swelling of the fines and the filling of the interstices of the ore particles, or even a coating of the particle surfaces. As a consequence, the porosity of the ore particles is reduced thereby preventing effective percolation of the leach solution with corresponding decreased leach solution percolation rate and decreased metal recovery rate.

To minimize the effect of slimes or fines, various treatments, e.g. flotation, have been practice on the ore prior to being heap leached in order to reduce the fines content. Various means have also been use during the heap-leaching procedure itself in an effort to increase the rate and quantity of metal recovery. CA92(16):132551q, for example, reports an increase in the percolation rate in the heap leaching of gold/silver ores by using a cyanide leach solution containing a flocculant such as polyethylene oxide. On the other hand, the use of a nonionic ethylene/propylene oxide-based surfactant in a gold/silver cyanide heap leaching solution, as reported in "Gold and Silver Heap and Dump Leaching Practice", pp. 41-49, Soc. Mining Eng., Proc. Fall 1983 SME Meeting, showed no affect on percolation rate, metal recovery rate or reagent consumption. The use of the surfactant, moreover, resulted in a drastic drop in the carbon efficiency of the subsequent metal recovery system.

SUMMARY OF THE INVENTION

As the prices of gold and silver increase, interest in developing improved procedures for treating low grade gold/silver ores for the recovery of these metal values increases. It is a principal object of this invention to fulfill this interest. It is a particular object of this invention to improve the leach rate of recovery of metal values from low grade gold/silver ores by the process of heap-leaching with a metal cyanide leach solution. It is a further object of this invention to obtain an improved leach rate without adversely affecting the carbon columns used in the subsequent separation of the metal cyanide complex from the pregnant leach solution.

DESCRIPTION OF THE PREFERRED EMBODIMENT

These objects have been met in accordance with this invention by incorporating in the aqueous metal cyanide solution used for leaching a low grade gold/silver ore an amount of a surfactant effective to improve the metal value recovery rate. While the use of a surfactant in a metal cyanide leach solution has been reported in the prior art referred to above, various adverse effects were observed without, moreover, any improvement being realized in the metal value recovery rate. It is essential, therefore, in order for a surfactant to be effective in heap-leaching, that it not only improve the rate of metal value recovery, but accomplish this without adversely affecting the carbon efficiency of the carbon columns used in the subsequent metal cyanide absorption step.

It has now been found, in accordance with this invention, that an improved metal value recovery rate can be obtained in heap-leaching of gold/silver ores without affecting carbon efficiency in the subsequent metal cyanide absorption step by incorporating in the cyanide leach solution an effective amount of a surfactant readily hydrolyzable under alkaline conditions. Without intent to limit this invention by any theory of operation, it may be that hydrolysis of the surfactant prior to or during the metal cyanide absorption step keeps the activated carbon surfaces more completely available for metal cyanide absorption.

An important class of surfactants that hydrolyzes readily at a pH of 10-11, i.e., the alkalinity of the cyanide leach solution, is ethoxylated fatty acid esters. Preferably, the surfactant comprises a fatty acid residue of 8-30 carbons and about 4-20 units of ethylene oxide. Condensates of ethylene oxide and oleic or stearic acids and mixtures of these, e.g., polyethylene glycol 200 distearate have been found to be particularly suitable.

Another class of surfactants effective in the practice of this invention is alkyl sulfosuccinates in which the alkyl is a fatty acid residue of 5-30 carbons. An example of this class of surfactants is sodium diethylhexyl sulfosuccinate.

Still another class of surfactants that may be used according to the present invention is long chain fatty alcohol sulfates in which the fatty alcohol residue contains about 8-30 carbons. Representative of such surfactants is sodium heptadecylsulfate.

In the practice of the process of this invention, the surfactant, or a mixture of surfactants, is simply incorporated in the aqueous alkali cyanide heap-leach solution and kept at a concentration effective to improve the rate of recovery of the metal value. It is difficult to define a concentration range of surfactant effective, in the sense of this invention, for use in the heap-leaching of ores of varying compositions since it will depend to a large extent on the nature of the ore, e.g., its clayeyness, as well as the particular surfactant employed. The optimum concentration effective in each circumstance, therefore, must be determined through use. Accordingly, it can be stated that, depending on the surfactant to be used and the ore to be treated, the surfactant concentration may be low as 1 ppm of leach solution with an upper limitation of about 50 ppm governed principally by economics. Usually, an optimum concentration of surfactant will be found to be within the range of 10-30 ppm of leach solution. A further benefit derived from the process of this invention resides in the concomitant defoaming action that is obtained under conditions of certain surfactant use. Thus, the hydrolysis of esters used in accordance with this invention will yield intermediate length-chain fatty alcohols which are well known defoamers. For example, the hydrolysis of diethylhexylsulfosuccinate releases ethyl hexanol, a particularly active defoamer. In this case, since the hydrolysis is relatively slow, there will be a constant presence of ethyl hexanol in the heap-leach solution circuit. This presence will have a lowering affect on foam formed in the waste discharge water and can even effectively influence both the ore extraction and the subsequent metal cyanide recovery by minimizing foam and air froth during these processes.

The process of the invention is further illustrated by the following examples in which all parts are by weight unless otherwise indicated.

EXAMPLE I

Ore Leaching Tests

A Nevada gold and silver ore identified as McCoy Ore was reduced to 80% minus ¾ inch and the head (oz. Au/ton ore) calculated for each of five samples. Each sample was then loaded into a 6 in. I.D.×6 ft. high column for leaching.

The surfactants and their concentrations in the aqueous sodium cyanide leach liquors applied to the five columns were as follows:

P1—11.25 ppm of polyethylene glycol 600 dioleate available under the trademark Drewsperse 739 from Drew Chemical Corporation.

P2—9.75 ppm of sodium diethylhexyl sulfosuccinate available under the trademark DrewFax 0007 from Drew Chemical Corporation.

P4—10 ppm of polyoxyethylene (20) sorbitan trioleate available under the trademark Tween 85 from ICI Americas Inc.

P5—30 ppm of polyethylene glycol 600 dioleate available under the trademark Drewsperse 739 from Drew Chemical Corporation.

P6—blank

Leaching was conducted by applying an aqueous sodium cyanide leaching solution (2 lbs. NaCN per ton of solution) over the ore charge in each column. The application rate, controlled by a calibrated chemical feed pump, was 0.005 gpm/ft$^2$, of column cross-sectional area. The pH was maintained during leaching by the addition of lime to the dry ore during column loading.

The aqueous cyanide leach solution was percolated through the ore charge in each column and collected in a pregnant solution reservoir daily. The volume of effluent solution was measured and a sample taken for precious metal analysis by conventional atomic adsorption methods. The pH and cyanide concentration of each effluent solution were determined. Fresh leach solution was prepared and applied to the ore charge daily. An equal amount of pregnant solution was saved daily from each column for the purpose of running carbon activity kinetic tests.

Results of the leaching tests appear in the following Table I.

TABLE I

| Results | P1 | P2 | P4 | P5 | P6 |
|---|---|---|---|---|---|
| Au Extraction (%) | | | | | |
| 1st Effluent | 54.5 | 61.2 | 59.0 | 66.2 | 58.7 |
| 5 days | 66.6 | 73.5 | 69.6 | 76.4 | 69.4 |
| 20 days | 78.6 | 84.6 | 83.4 | 86.6 | 79.5 |
| 30 days | 80.7 | 86.9 | 86.2 | 89.5 | 82.1 |
| 35 days | 80.7 | 87.3 | 86.5 | 90.4 | 82.5 |
| Au Extracted (oz/ton ore) | .051 | .052 | .051 | .043 | .047 |
| Tail Assay (oz Au/ton ore) | .013 | .014 | .018 | .010 | .010 |
| Calc. Head (oz Au/ton ore) | .064 | .066 | .069 | .053 | .057 |
| Cyanide consumed (lb NaCN/ton ore) | .50 | .47 | .52 | .49 | .46 |
| Lime added (lb/ton ore) | 3.50 | 3.30 | 3.30 | 3.50 | 3.50 |
| Final sol. pH | 11.0 | 11.0 | 10.8 | 10.8 | 10.8 |

Following 35 days of leaching, the above data show that gold extractions varied from 90.4% for P5 to 80.7% for P1 as compared to 82.5% for P6 (Blank). The failure to show comparable improved extraction for P1 appears to be the result of the low concentration of surfactant employed as compared, for instance, to P5 in which a greater amount of the same surfactant was employed with significantly improved results. The cyanide requirements ranged from 0.49 to 0.83 pounds NaCN per ton of ore compared with 0.46 pounds/ton for the blank. Cyanide consumption, therefore, was not significantly affected by the use of a surfactant. The lime requirements were low for all of the columns at 3.3-3.5 pounds CaO per ton of ore.

Statistical testing was conducted in order to compare the means of each column with the blank column. The testing allows for the elimination of standard errors introduced in each column and also takes into consideration the effects of rate of recovery of gold in each column. Both the F-Test and the T-Test treatments measure the 95% confidence as to whether the means of two populations are significantly different. Statistical results appear in the following Table II.

TABLE II

| Statistical Results | P1 | P2 | P4 | P5 |
|---|---|---|---|---|
| Variance | 41.8 | 38.5 | 52.5 | 33.9 |
| Mean | 75.4 | 81.7 | 80.1 | 84.3 |
| Mean Variance (Compared to Blank) | 37.5 | 35.9 | 42.8 | 33.6 |
| Variance of Means (Compared to Blank) | 1.4 | 10.9 | 4.5 | 26.2 |
| F | 1.289 | 10.310 | 3.604 | 26.574 |
| T | 1.135 | 3.548 | 1.428 | 5.155 |
| 95% Significantly Different | No | Yes | No | Yes |

The above data show that at the 95% confidence level, a one way analysis of variance shows that P2 and P5 are significantly better than the blank for both the rate and absolute extraction.

EXAMPLE II

Carbon Kinetics Tests

Tests were conducted using 1 gram (Calgon GRC-22, 6×16 mesh) of coconut shell carbon in 1 liter of pregnant solution saved from each column for this purpose from the extraction tests of Example I. The tests were conducted by agitating the carbon in the pregnant solution for 24 hours while the solutions were withdrawn at different time intervals and tested for gold and silver. The results from the 24 hr. testing appear in Table III.

TABLE III

| Col. | Vol. (1) | Preg. Sol. (ppm Au) | Barren Sol. (ppm Au) | Carbon Loading (oz Au/ton C) |
|------|------|---------------------|----------------------|------------------------------|
| P1   | .93  | 0.84                | 0.02                 | 25.770[1]                    |
| P2   | .93  | 0.84                | 0.04                 | 25.142[2]                    |
| P4   | .93  | 0.84                | 0.01                 | 26.084[4]                    |
| P5   | .93  | 0.84                | 0.04                 | 25.142[5]                    |
| P6   | .93  | 0.84                | 0.01                 | 26.084[6]                    |

Carbon Assay Checks (oz Au/ton C): (1) 25.091, (2) 25.335, (4) 25.513, (5) 23.356, (6) 25.778

The above data show that the presence of the surfactants does not have a diminishing effect on the adsorption capacity of the coconut shell carbon.

I claim:

1. In a process for recovering gold and silver values in which an aqueous alkali cyanide leach solution of about pH 10–11 is percolated through a heap of particulated gold/silver-bearing ore to form a pregnant leach solution containing extracted gold and silver as metal cyanide complexes; separating said extracted metal cyanide complexes from said pregnant leach solution by absorption on a column of activated carbon; and subjecting said activated carbon column to a stripping circuit in which the metal cyanide complexes are desorbed, the improvement which comprises extracting said gold and silver values using an aqueous alkali cyanide leach solution containing at least about 1 ppm of a surfactant which is hydrolyzable at the alkalinity of said leach solution and which does not interfer with the effectiveness of the subsequent carbon absorption of the metal cyanide complexes from said pregnant leach solution.

2. The improvement according to claim 1 in which the hydrolyzable surfactant is selected from ethoxylated fatty acid esters, alkyl sulfosuccinates and fatty alcohols.

3. The improvement according to claim 2 in which the surfactant is selected from (a) polyethylene glycol dioleate in which the polyethylene glycol portion has a molecular weight of 600; sodium diethylhexyl sulfosuccinate; and (c) polyoxyethylene sorbitan trioleate having 20 ethylene oxide groups per molecule.

4. The improvement according to claim 3 in which the aqueous alkali cyanide leach solution contains about 10–30 ppm of surfactant.

* * * * *